(12) United States Patent
Armangau et al.

(10) Patent No.: US 10,585,594 B1
(45) Date of Patent: Mar. 10, 2020

(54) CONTENT-BASED CACHING USING DIGESTS

(71) Applicant: EMC IP Holding Company LLC, Hopkinton, MA (US)

(72) Inventors: Philippe Armangau, Acton, MA (US); Maher Kachmar, Marlborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 15/668,307

(22) Filed: Aug. 3, 2017

(51) Int. Cl.
| | |
|---|---|
| *G06F 3/06* | (2006.01) |
| *G06F 16/14* | (2019.01) |
| *G06F 12/02* | (2006.01) |
| *G06F 12/0802* | (2016.01) |
| *G06F 12/0864* | (2016.01) |

(52) U.S. Cl.
CPC ............ *G06F 3/0611* (2013.01); *G06F 3/065* (2013.01); *G06F 3/067* (2013.01); *G06F 3/0638* (2013.01); *G06F 16/14* (2019.01); *G06F 12/0292* (2013.01); *G06F 12/0802* (2013.01); *G06F 12/0864* (2013.01); *G06F 2212/6022* (2013.01)

(58) Field of Classification Search
CPC ........ G06F 3/0611; G06F 16/14; G06F 3/065; G06F 12/0638; G06F 2212/6022
See application file for complete search history.

(56) References Cited

U.S. PATENT DOCUMENTS

| | | |
|---|---|---|
| 9,122,712 B1 | 9/2015 | Bono et al. |
| 9,727,479 B1 | 8/2017 | Armangau et al. |
| 9,779,023 B1 | 10/2017 | Armangau et al. |
| 9,880,743 B1 | 1/2018 | Armangau et al. |
| 9,880,928 B1 | 1/2018 | Bono et al. |
| 9,985,649 B1 | 5/2018 | Bassov et al. |
| 2011/0265083 A1* | 10/2011 | Davis .................. G06F 12/0866 718/1 |
| 2015/0127612 A1* | 5/2015 | Balcha ................ G06F 11/1451 707/645 |

(Continued)

OTHER PUBLICATIONS

Hogan; Cormac, VMFS Extents—Are they bad, or simply misunderstood?, 2012, vmWare Blogs (Year: 2012).*

(Continued)

*Primary Examiner* — Reginald G Bragdon
*Assistant Examiner* — Edward Wang
(74) *Attorney, Agent, or Firm* — BainwoodHuang

(57) ABSTRACT

A method of responding to requests to read data from a computerized data storage system is disclosed. The method includes (a) receiving a request to access a set of data stored in an extent of persistent storage of the computerized data storage system, (b) obtaining, from mapping metadata provided for locating the requested extent, a hash digest of the set of data, the hash digest identifying contents of the set of data, (c) indexing into a content-based cache within memory of the computerized data storage system with a key based on the hash digest to locate a cached copy of the set of data within the memory, and (d) returning the cached copy of the set of data from the memory without accessing the extent of data from persistent storage. An apparatus, system, and computer program product for performing a similar method are also provided.

16 Claims, 5 Drawing Sheets

(56) References Cited

U.S. PATENT DOCUMENTS

2018/0007158 A1* 1/2018 Hack ................ H04L 67/2842

OTHER PUBLICATIONS

Armangau, et al.; "Managing File System Metadata Using Persistent Cache," U.S. Appl. No. 15/669,364, filed Aug. 4, 2017.

Bassov, et al.; "Compressing Data in Line Using Weighted Compression Budgets," U.S. Appl. No. 15/392,639, filed Dec. 28, 2016.

Bono, et al.; "Selective Application of Block Virtualization Structures in a File System," U.S. Appl. No. 14/577,387, filed Dec. 19, 2014.

Dalmatov; "Maintaining a Single Copy of Data Within a Read Cache," U.S. Appl. No. 16/066,498, filed Jun. 27, 2018.

Hu, et al.; "Performing Block Deduplication Using Block Sequence Classifications," U.S. Appl. No. 14/671,017, filed Mar. 27, 2015.

Armangau, et al.; "Inline Deduplication of Compressed Data," U.S. Appl. No. 14/980,944, filed Dec. 28, 2015.

Armangau, et al.; "Overwriting Compressed Data Extents," U.S. Appl. No. 15/499,206, filed Apr. 27, 2017.

Si, et al.; "Write Tagging for Selective Avoidance of Inline Compression," U.S. Appl. No. 15/499,467, filed Apr. 27, 2017.

Si, et al.; "Inline Compression With Small-Write Compression Avoidance," U.S. Appl. No. 15/662,676, filed Jul. 28, 2017.

Usvyatsky, et al.; "Performing Reconciliation on a Segmented De-Duplication Index to Reference Just One of a First Copy and a Second Copy of a Particular Data Block," U.S. Appl. No. 15/664,185, filed Jul. 31, 2017.

Usvyatsky, et al.; "Techniques for De-Duplicating Data Storage Systems Using a Segmented Index," U.S. Appl. No. 15/394,376, filed Dec. 29, 2016.

Armangau, et al.; "Speeding De-Duplication Using a Temporal Digest Cache," U.S. Appl. No. 15/668,388, filed Aug. 3, 2017.

* cited by examiner

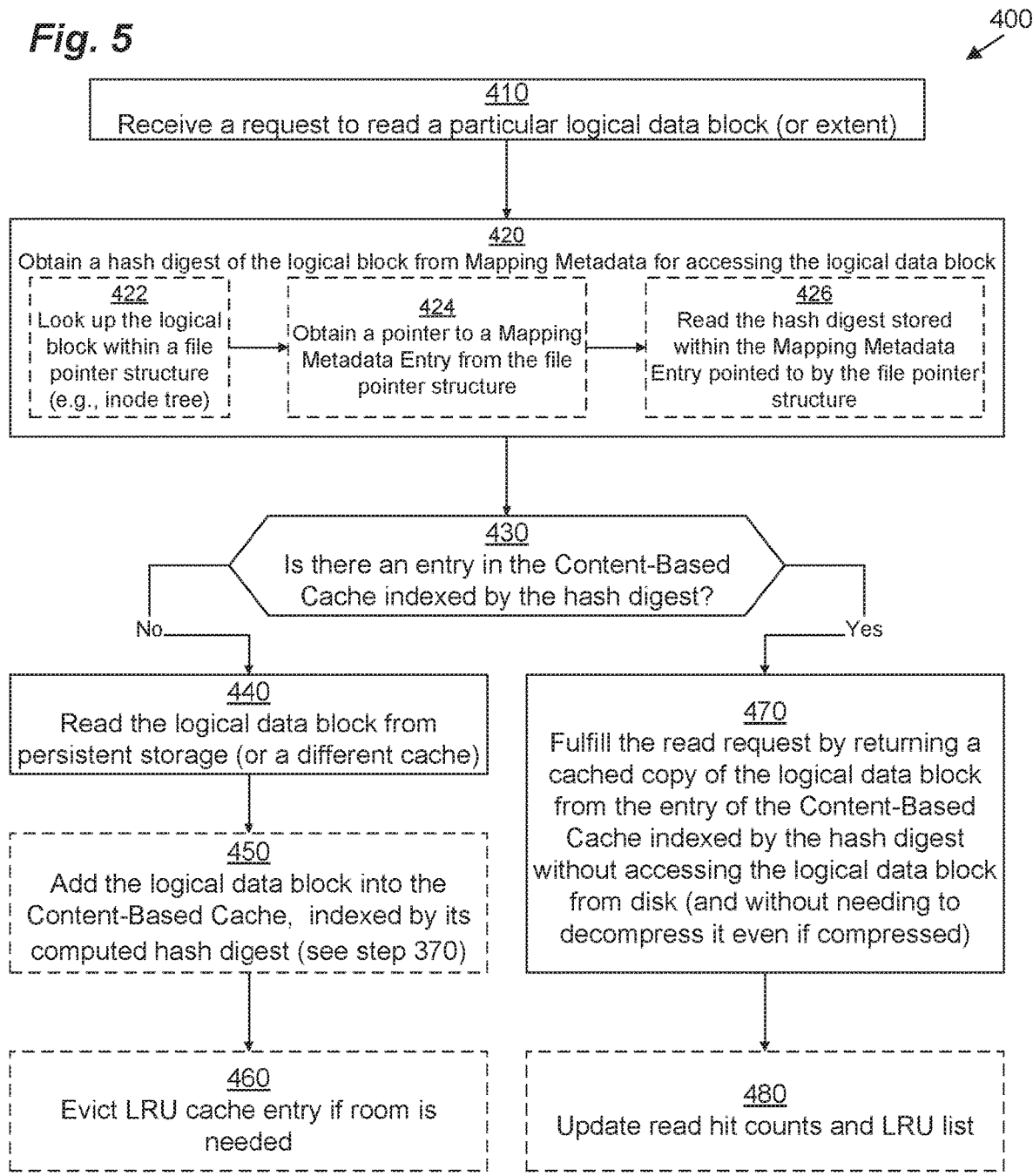

CONTENT-BASED CACHING USING DIGESTS

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Some data storage systems employ read caching to perform read I/O operations in a faster manner. When a data block is requested to be read from a storage object, the data storage system may read several additional blocks that logically follow the requested block in the storage object and store them in a cache portion of memory. Storage systems often read data sequentially, in order of logical address. If consecutive read requests are directed to cached blocks, then such read requests may be fulfilled directly from memory, improving performance.

SUMMARY

Unfortunately, many applications access data in a random manner where read caching of this kind is of little use. Thus, it would be desirable to implement a form of read caching that works well for random reads. This may be accomplished by caching data based on its content, rather than on its sequentiality. For example, a storage system may compute hash digests that identify extents of persistent data based on their contents and store such hash digests as metadata. When processing read requests to access extents of data, the storage system accesses metadata for the extents and retrieves their hash digests. The storage system may then use the retrieved hash digests for indexing into a content-based cache, where the hash digests correspond to locations of extents of data in the cache. This approach allows data to be retrieved quickly based on content, and is thus effective for both sequential data and for random data. In addition, the disclosed techniques may be easily implemented in systems that already support hash digests for data de-duplication, regardless of whether de-duplication is implemented or not.

In one embodiment, a method of responding to requests to read data from a computerized data storage system is performed. The method includes (a) receiving a request to access a set of data stored in an extent of persistent storage of the computerized data storage system, (b) obtaining, from mapping metadata provided for locating the requested extent, a hash digest of the set of data, the hash digest identifying contents of the set of data, (c) indexing into a content-based cache within memory of the computerized data storage system with a key based on the hash digest to locate a cached copy of the set of data within the memory, and (d) returning the cached copy of the set of data from the memory without accessing the extent of data from persistent storage. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 5 is a flowchart depicting example methods of various embodiments.

DETAILED DESCRIPTION OF THE INVENTION

Embodiments are directed to techniques for read caching that work well for random reads. This may be accomplished by caching data based on its content, rather than on its sequentiality. For example, a storage system may compute hash digests that identify extents of persistent data based on their contents and store such hash digests as metadata. When processing read requests to access extents of data, the storage system accesses metadata for the extents and retrieves their hash digests. The storage system may then use the retrieved hash digests for indexing into a content-based cache, where the hash digests correspond to locations of extents of data in the cache. This approach allows data to be retrieved quickly based on content, and is thus effective for both sequential data and for random data. In addition, the disclosed techniques may be easily implemented in systems that already support hash digests for data de-duplication, regardless of whether de-duplication is implemented or not.

Figure 1:
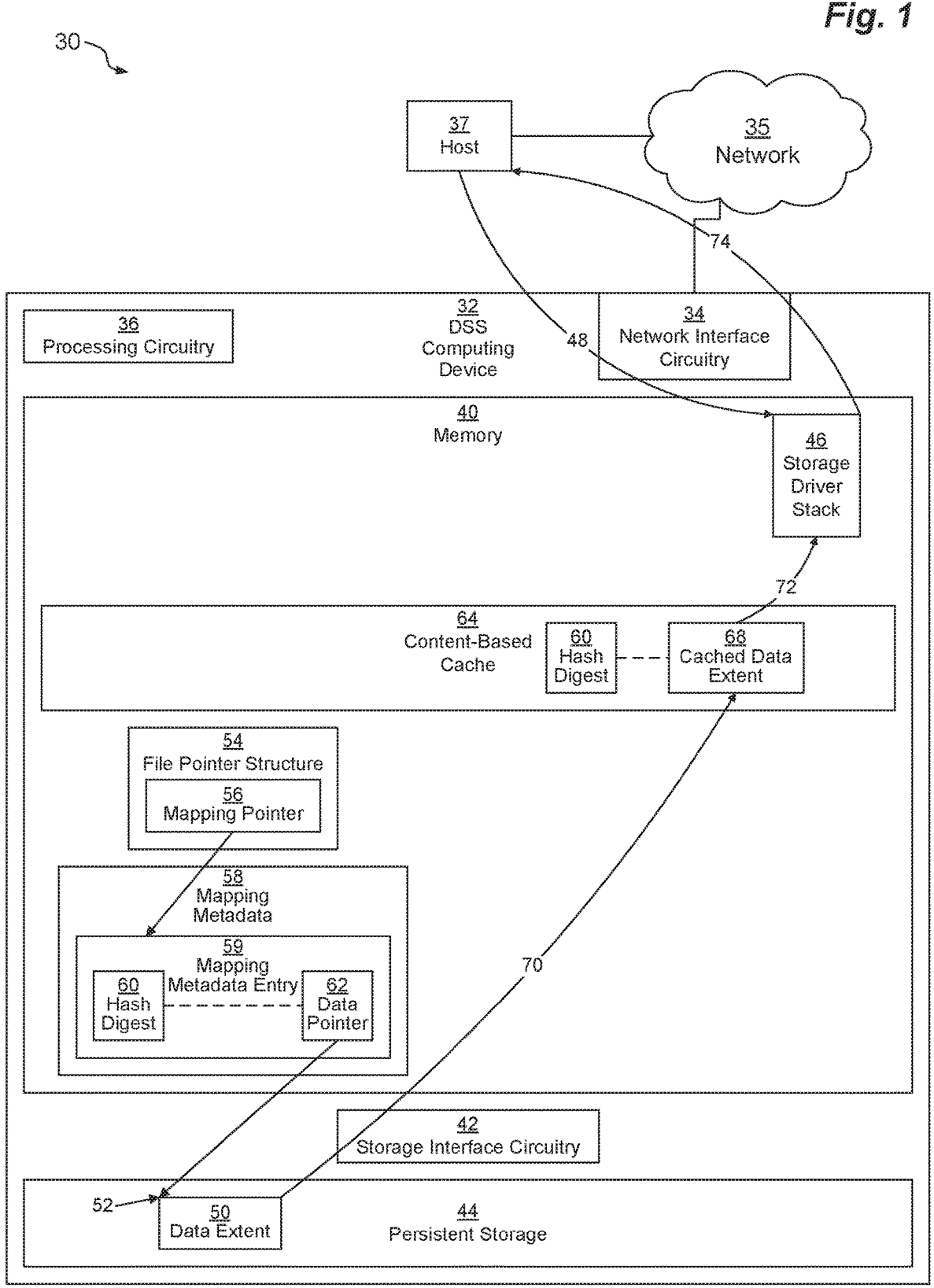
FIG. 1 is a block diagram depicting an example system and apparatus for use in connection with various embodiments.

FIG. 1 depicts an example environment 30 including a computing device 32 serving as a data storage system (DSS). DSS computing device 32 may be any kind of computing device, such as, for example, a personal computer, workstation, server computer, enterprise server, DSS rack server, laptop computer, tablet computes, smart phone, mobile computer, etc. In an example, computing device 32 is a DSS rack server.

DSS computing device 32 includes network interface circuitry 34, processing circuitry 36, memory 40, storage interface circuitry 42, and persistent data storage 44. DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network 35. Network interface circuitry 34 allows the DSS computing device 32 to communicate with one or more host devices 37 capable of sending data storage commands to the DSS computing device 32 over network 35 for fulfillment.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, DSS computing device 32 may be built as a set of two or more storage processors (SPs, not depicted) each mounted on a separate board, each SP having its own network interface circuitry 34, processing circuitry 36, memory 40, and storage interface circuitry 42, but sharing the storage 44 between them. In such embodiments, a high-speed inter-SP bus may connect the SPs. There may be more than one SP installed in DSS 32 for redundancy and performance reasons. In these embodiments, each SP may be considered independently for purposes of this disclosure.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

Memory 40 may be any kind of digital system memory, such as, for example, random access memory (RAM). Memory 40 stores an operating system (OS, not depicted) in operation (e.g., a Linux, UNIX, Windows, MacOS, or similar operating system kernel). Memory 40 also stores a storage driver stack 46 (which may include several different storage-related drivers, not depicted, that are arranged in a stack configuration) which executes on processing circuitry 36 to fulfill data storage requests from hosts 37. Memory 40 also includes a content-based cache 64 as well as various other data structures used by the OS, storage driver stack 46, content-based-cache 64, and various other applications (not depicted). This data includes at least one file pointer structure 54 and mapping metadata 58.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS, applications, storage driver stack 46, file pointer structures 54, and mapping metadata 58 are typically stored in this persistent storage portion of memory 40 or on persistent storage 44 so that they may be loaded into a system portion of memory 40 from this persistent storage portion of memory 40 or persistent storage 44 upon a system restart or as needed. Storage driver stack 46, when stored in non-transient form either in the volatile portion of memory 40 or on persistent storage drives 44 or in persistent portion of memory 40, forms a computer program product. The processing circuitry 36 running one or more applications and/or storage driver stack 46 thus forms a specialized circuit constructed and arranged to carry out the various processes described herein.

In operation, a host 37 sends data storage requests 48 to storage driver stack 46, which processes these commands. A data storage request 46 may be of various types, includes READ and WRITE requests, for example. In some examples, data storage requests 48 are file-based requests aimed at logical addresses within files (not depicted) of filesystems (not depicted) that are stored on logical disks (LUNs, not depicted) that are backed by persistent storage 44 as is well-known in the art. In other examples, data storage requests 48 are block-based requests aimed at offsets within particular LUNs. In such cases, the storage driver stack 46 may translate block-based requests into file-based requests directed to a file or files within an internal file system. Storage driver stack 46 fulfills the storage requests 48 by transforming these storage requests into low-level data storage requests aimed at particular addresses within the persistent storage 44, executing these low-level storage requests either via the storage interface circuitry 42 and the persistent storage or via an in-memory cache such as content-based cache 64 (although other caches may also be used).

When a data storage request 48 is a READ request to read data from a file (or another similar structure) that is mapped by a file pointer structure 54 (such as an inode pointer structure made up of an inode and, if necessary, a set of indirect blocks) containing a set of mapping pointers 56 to locate the data for the file, storage driver stack 46 accesses a particular mapping pointer 56 based on the requested address within the file. The mapping pointer 56 points to a mapping metadata entry 59, such as within an extent list, within mapping metadata 58, which may include a virtual block map (VBM), of the DSS computing device 32. The mapping metadata entry 59 includes a data pointer 62 that points to a particular address 52 within persistent storage 44 where a data extent 50 is stored that provides data of the file at the requested address. In one embodiment, data extent 50 is a block (e.g., 512 bytes, 4 kilobytes, 8 kilobytes, etc.) of the persistent storage that stores a block of data logically addressed by the mapping pointer 56. In another embodiment, data extent 50 may be compressed to be smaller than a block, such that it stores compressed data that when decompressed is logically addressed by the mapping pointer 56. Additional information about extent lists and VBMs may be found in co-pending U.S. patent application Ser. No. 15/499,206, filed Apr. 27, 2017, the contents and teachings of which are incorporated herein by this reference.

Mapping metadata entry 59 also stores a hash digest 60 that represents the data stored within the data extent 50. Hash digest 60 may be, for example, a value that was generated by applying a cryptographic hashing algorithm to the data stored within the extent. In an example, the hashing algorithm is SHA-2, although this is not required, as other algorithms may also be used, such as SHA-0, SHA-1, SHA-3, and MD5. Such algorithms may provide bit-depths such as 128 bits, 160 bits, 172 bits, 224 bits, 256 bits, 384 bits, and 512 bits, for example). Preferably an advanced hashing algorithm with a high bit-depth is used to ensure a low probability of hash collisions between different data blocks, such as fewer than one collision in $2^{80}$ or $2^{128}$, for example.

In some embodiments, hash digest 60 is used to implement a data de-duplication feature. Thus, several different mapping pointers 56 located within a single file pointer structure 54 (for a single storage object) or within different file pointer structures 54 (for more than one storage object) may all point to the same mapping metadata entry 59. A storage object may be a file, for example. This allows data portions within a single file or within several different files that all store identical content to be backed by only one data extent 50 on persistent storage 44, since they all have identical data and thus produce identical hash digests 60.

When a data storage request 48 that is a READ maps to a particular mapping metadata entry 59, storage driver stack 46 may first read the hash digest 60 stored therein and index into the content-based cache 64 using the hash digest 60 to determine if there is a cached data extent 68 within the content-based cache 64 that stores the data of the underlying data extent 50. If there is such a cached data extent 68 within the content-based cache 64, then storage driver extent 46 is able to fulfill the data storage request 48 by returning (step 74) the cached data extent 68 from the cached data extent 68 (step 72) in memory 40 without needing to access the persistent storage 44 (which is typically much slower than accessing memory 40). However, if content-based cache 64 does not store a cached data extent 68 indexed by the hash digest 60 from the mapping metadata entry 59, then storage driver stack 46 accesses the data extent 50 from the persistent storage 44 and stores (step 70) its contents within content-based cache 64 indexed by the hash digest 60. In an example, data in the content-based cache 64 is stored in uncompressed form. Storing the contents in the content-based cache 64 speeds up operation the next time any data extent 50 whose contents are represented by hash digest 60 needs to be accessed.

Figure 2:
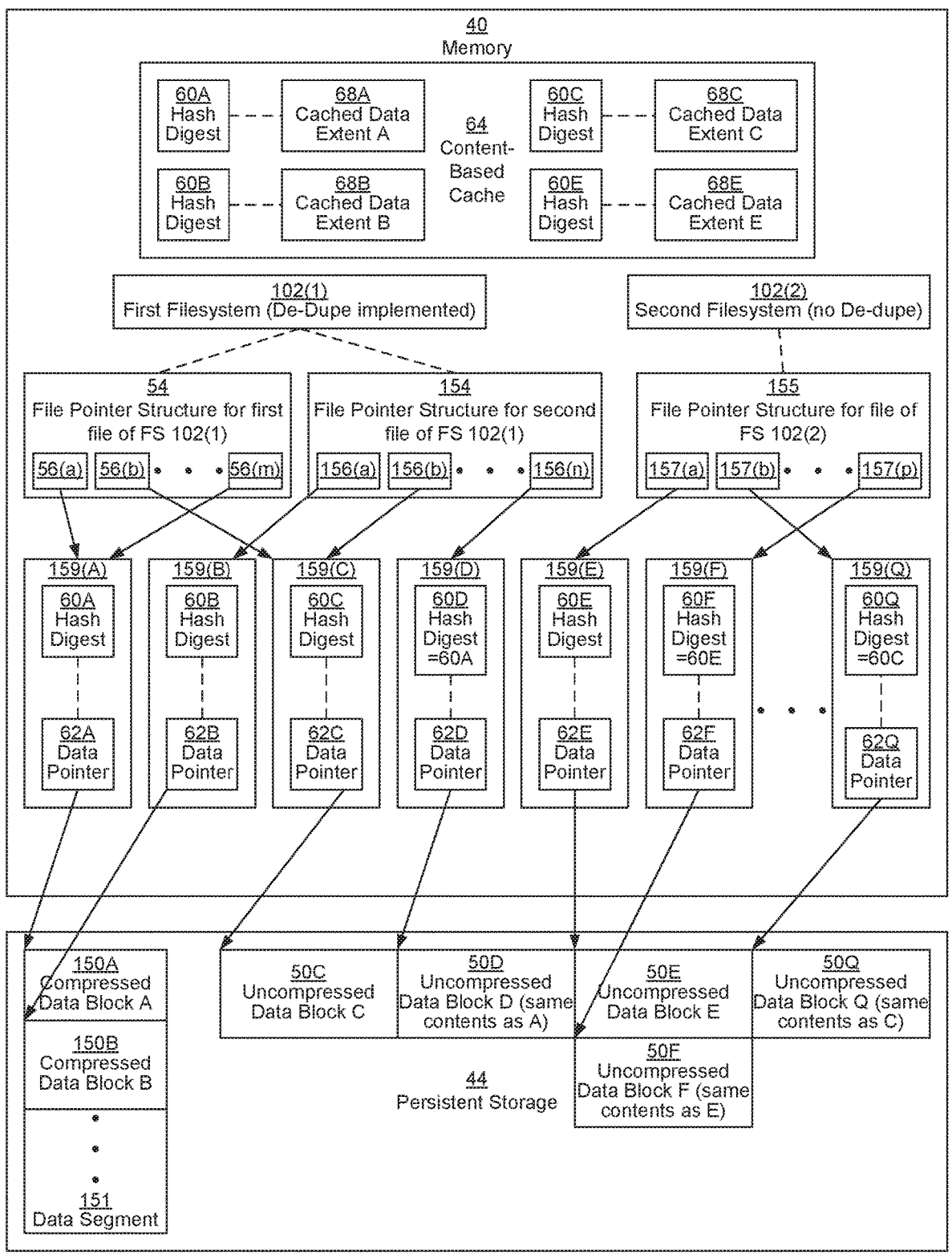
FIG. 2 is a block diagram depicting example data structures used in connection with various embodiments.

FIG. 2 depicts an example arrangement 100 of certain data structures within memory 40 and persistent storage 44 in example operation of various embodiments.

DSS computing device 32 may manage one or more filesystems 102 (depicted as filesystems 102(1), 102(2)). Filesystem 102(1) includes two files (not depicted). A first file has file pointer structure 54, while a second file has file pointer structure 154. First file pointer structure 54 includes m mapping pointers 56 (depicted as mapping pointers 56(a), 56(b), ..., 56(m)), and second pointer structure 154 includes n mapping pointers 156 (depicted as mapping pointers 156(a), 156(b), ..., 156(n)). Thus, for example, if each mapping pointer 56, 156 logically addresses 8 kilobytes, then the first file has m×8 kilobytes of addressable space, and the second file has n×8 kilobytes of addressable space.

As depicted, filesystem 102(1) supports data de-duplication, and data has been de-duplicated in the files mapped by file pointer structures 54, 154. Both mapping pointers 56(a) and 56(m) of the first file point to the same mapping metadata entry 159(A). In addition, mapping pointer 56(b) from the first file and mapping pointer 156(b) of the second file both point to the same mapping metadata entry 159(B). In addition, mapping pointer 156(a) of the second file points to mapping metadata entry 159(B), while mapping pointer 156(n) of the second file points to mapping metadata entry 159(D), neither of which is de-duplicated.

Mapping metadata entry 159(A) includes hash digest 60A as well as data pointer 62A, while mapping metadata entry 159(B) includes hash digest 60B as well as data pointer 62B. Data pointer 62A points to compressed data block 150A stored in persistent storage 44, while data pointer 62B points to compressed data block 150B stored in persistent storage 44. Since data blocks 150A, 150B are both compressed, they are stored within a data segment 151 that is used to aggregate compressed data blocks 150. Thus, for example, in one embodiment, data segments 151 are 64 kilobytes blocks long, so they take up eight blocks in persistent storage. However, because data segments 151 store data blocks 150 in compressed form, each data segment 101 stores at least nine compressed data blocks 150 (or more, depending on how compressible they are). Because compressed data blocks 150 each take up less than 8 kilobytes on disk, the locations of each compressed data block 150 after the first compressed data block 150A within a segment 151 are not on standard block boundaries. In some embodiments, all mapping metadata entries 159(A), 159(B) for compressed data blocks 150A, 150B within a single segment 151 are aggregated together within a single mapping structure (not depicted).

Mapping metadata entry 159(C) includes hash digest 60C as well as data pointer 62C, while mapping metadata entry 159(D) includes hash digest 60D as well as data pointer 62D. Data pointer 62C points to uncompressed data block 50C stored in persistent storage 44, while data pointer 62D points to uncompressed data block 50D stored in persistent storage 44. Since data blocks 50C, 50D are both uncompressed, they are stored as entire blocks of storage 44 that begin at standard block boundaries. As depicted, uncompressed data block 50D actually stores the exact same underlying content as compressed data block 150A, however, a de-duplication operation has not yet been performed on mapping metadata entry 159(D), so mapping pointer 156(n) still points to mapping metadata entry 159(D) rather than to mapping metadata entry 159(A). In some embodiments, several mapping metadata entries 159(C), 159(D) for uncompressed data blocks 50C, 50D may be aggregated together within a single mapping structure (not depicted).

Even though there are six mapping pointers 56(a), 56(b), 56(m), 156(a), 156(b), 156(n) depicted within file pointer structures 54, 154, representing six logical blocks of addressable storage, due to data de-duplication, these mapping pointers 56(a), 56(b), 56(m), 156(a), 156(b), 156(n) only require four blocks 150A, 150B, 50C, 50D of backing on persistent storage 44 (taking up less than 4 physical blocks due to the compression of blocks 150A, 150B). In addition, content-based cache 64 is able to represent this data using only three cached data extents 68A, 68B, 68C because uncompressed data block D has the same underlying content as compressed data block 150A. Thus, hash digest 60D is equal to hash digest 60A.

Content-based cache 64 stores cached data extent 68A which is indexed by hash digest 60A. Cached data extent 68A is a de-compressed version of compressed data block 150A. Content-based cache 64 also stores cached data extent 68B which is indexed by hash digest 60B. Cached data extent 68B is a de-compressed version of compressed data block 150B. Content-based cache 64 also stores cached data extent 68C which is indexed by hash digest 60C. Cached data extent 68B is equivalent to uncompressed data block 50C, but stored in memory 44 rather than in persistent storage 44.

If storage driver stack 46 receives a READ storage request 48 directed at the first 8 kilobytes of the first file of filesystem 102(1) (or the last 8 kilobytes of the first file of filesystem 102(1)), then, after retrieving mapping pointer 56(a) (or mapping pointer 56(m)) and using it to access the mapping metadata entry 159(A), storage driver stack 46 reads hash digest 60A from mapping metadata entry 159(A) and checks to see if it is indexed in content-based cache 64. Since compressed data block 150A had recently been accessed, cached data extent 68A is still in the content-based cache 64, and so is hash 60A, so storage driver stack 46 is able to respond to the READ storage request 48 by returning the cached data extent 68A from content-based cache 64. In addition to saving an expensive read to persistent storage 44, an expensive decompression operation has also been saved.

If storage driver stack 46 receives a READ storage request 48 directed at the second 8 kilobytes of the first file of filesystem 102(1) (or the second 8 kilobytes of the second file of filesystem 102(1)), then, after retrieving mapping pointer 56(b) (or mapping pointer 156(b)) and using it to access the mapping metadata entry 159(C), storage driver stack 46 reads hash digest 60C from mapping metadata entry 159(C) and checks to see if it is indexed in content-based cache 64. Since uncompressed data block 50C had recently been accessed, cached data extent 68C is still in the content-based cache 64, and so is hash 60C, so storage driver stack 46 is able to respond to the READ storage request 48 by returning the cached data extent 68C from content-based cache 64.

If storage driver stack 46 receives a READ storage request 48 directed at the first 8 kilobytes of the second file of filesystem 102(1), then, after retrieving mapping pointer 156(*a*) and using it to access the mapping metadata entry 159(B), storage driver stack 46 reads hash digest 60B from mapping metadata entry 159(B) and checks to see if it is indexed in content-based cache 64. Since compressed data block 150B had recently been accessed, cached data extent 68B is still in the content-based cache 64, and so is hash 60B, so storage driver stack 46 is able to respond to the READ storage request 48 by returning the cached data extent 68B from content-based cache 64.

If storage driver stack 46 receives a READ storage request 48 directed at the last 8 kilobytes of the second file of filesystem 102(1), then, after retrieving mapping pointer 156(*m*) and using it to access the mapping metadata entry 159(D), storage driver stack 46 reads hash digest 60D from mapping metadata entry 159(D) and checks to see if it is indexed in content-based cache 64. Although uncompressed data block 50D had not recently been accessed, since compressed data block 150A had recently been accessed, cached data extent 68A is still in the content-based cache 64, and so is hash 60A, which is equal to hash 60D, so storage driver stack 46 is able to respond to the READ storage request 48 by returning the cached data extent 68A from content-based cache 64.

In some embodiments, instead of the first file and the second file of filesystem 102(1) being separate files that share de-duplicated data, the first file and the second file of filesystem 102(1), the second file may be a snapshot of the first file at a prior moment in time.

As depicted, second filesystem 102(2) stores a third file (not depicted) that has third file pointer structure 155. Third file pointer structure 155 includes p mapping pointers 157 (depicted as mapping pointers 157(*a*), 157(*b*), . . . , 157(*p*)). Thus, for example, if each mapping pointer 157 logically addresses 8 kilobytes, then the third file has p×8 kilobytes of addressable space.

As depicted, filesystem 102(2) does not support data de-duplication. Thus, although the contents of the first 8 kilobytes of the third file and the last 8 kilobytes of the third file are identical, mapping pointers 157(*a*), 157(*p*) point to separate mapping metadata entries 159(E), 159(F). In addition, because there is no de-duplication between separate filesystems 102(1), 102(2), although the contents of the second 8 kilobytes of the third file are identical to the contents of the second 8 kilobytes of the first file (and the second file), mapping pointer 157(*b*) points to a separate mapping metadata entry 159(Q) than does metadata mapping pointer 56(*b*) (or 156(*b*)).

Mapping metadata entry 159(E) includes hash digest 60E as well as data pointer 62E, while mapping metadata entry 159(F) includes hash digest 60F as well as data pointer 62F and mapping metadata entry 159(Q) includes hash digest 60Q as well as data pointer 62Q. Data pointer 62E points to uncompressed data block 50E stored in persistent storage 44, while data pointer 62F points to uncompressed data block 50F stored in persistent storage 44 and data pointer 62Q points to uncompressed data block 50Q stored in persistent storage 44. Since data blocks 50E, 50F, 50Q are all uncompressed, they are stored as entire blocks of storage 44 that begin at standard block boundaries. As depicted, uncompressed data blocks 50E, 50F actually stores the exact same underlying contents, however, since there is no de-duplication performed in filesystems 102(2), blocks 50E and 50F are both stored in persistent storage 44 separately. As depicted, uncompressed data block 50Q actually stores the exact same underlying content as uncompressed data block 50C, however, since there is no de-duplication between unrelated filesystems 102(1), 102(2), blocks 50C and 50Q are both stored in persistent storage separately.

The first time either the first or last 8 kilobytes of the third file are accessed (for example, assume that the first 8 kilobytes of the third file are accessed first), storage driver stack 46 accesses the hash digest 60E. Since hash 60E is not yet in the content-based cache 64 at this point, storage driver stack 46 adds hash 60E to the content-based cache 64 and uses it to index cached data extent 68E in content-based cache 64 after reading uncompressed data block 50E from persistent storage 44. However, the second time either the first or last 8 kilobytes of the third file are accessed (for example, assume that the second 8 kilobytes of the third file are now accessed), storage driver stack 46 accesses the hash digest 60F. Since hash 60E is in the content-based cache 64 and hash 60E is equal to hash 60F, storage driver stack 46 indexes into content-based cache 64 using hash 60F and obtains cached data extent 68E without needing to access uncompressed data block 50F (or 50E) from persistent storage 44, and storage driver stack 46 is able to return the cached data extent 68E to host 37 in fulfillment of request 48.

The first time that the second 8 kilobytes of the third file are accessed, storage driver stack 46 accesses the hash digest 60Q. Since hash 60Q is equal to hash 60C, which is already in the content-based cache 64 from operation of first filesystem 102(1), storage driver stack 46 indexes into content-based cache 64 using hash 60Q and obtains cached data extent 68C without needing to access uncompressed data block 50Q (or 50C) from persistent storage 44, and storage driver stack 46 is able to return the cached data extent 68C to host 37 in fulfillment of request 48.

Figure 3A:
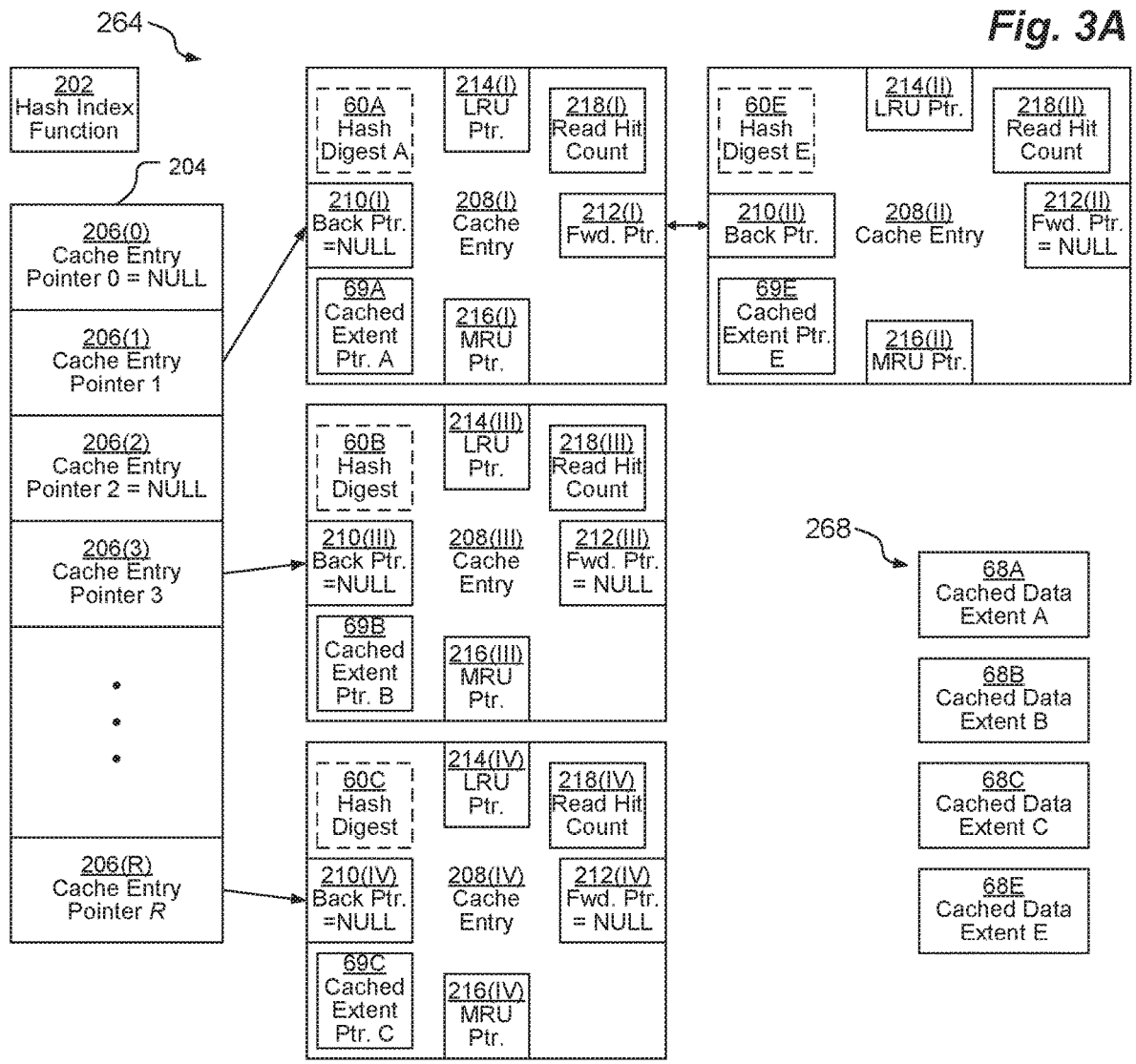
FIGS. 3A and 3B are block diagrams depicting an example Content-Based Cache according to various embodiments.

FIG. 3A depicts an example content-based cache 264 according to some embodiments. Content-based cache 264 includes a hash index function 202 which is configured to receive a hash digest 60 as an input and to output an index within the range of zero to R for some integer R (e.g., R=1000). Hash index function 202 is designed to evenly distribute all possible hash digests (e.g., ranging from zero to $2^{256}-1$) into R+1 bins. The output of hash index function 202 is used as an index into an array 204 of cache entry pointers 206 (depicted as cache entry pointers 206(0), 206(1), 206(2), 206(3), . . . , 206(R)), which may be sparsely populated. Thus, as depicted, many of the cache entry pointers 206 have NULL values. Other cache entry pointers 206(1), 206(3), 206(R) point to cache entries 208, which may be arranged in linked lists.

Each cache entry 208 includes a cached extent pointer 69 and a read hit count 218. In addition, in some embodiments, each cache entry includes a hash digest 60. As depicted, cache entry 208(I) has hash digest 60A, cached extent pointer 69A (which points to cached data extent 68A), and read hit count 218(I); cache entry 208(11) has hash digest 60E, cached extent pointer 69E (which points to cached data extent 68E), and read hit count 218(I); cache entry 208(111) has hash digest 60B, cached extent pointer 69B (which points to cached data extent 68B), and read hit count 218(I); and cache entry 208(IV) has hash digest 60C, cached extent pointer 69C (which points to cached data extent 68C), and read hit count 218(I).

Cached data extents 68 are stored in a data portion 268 of content-based cache 264, which may be separately drawn from a portion of memory 40 dedicated to storing cached data.

Each cache entry 208 may also store a back pointer 210 and a forward pointer 212 to effectuate a linked list structure for each bin associated with each respective cache entry pointer 206 (although, in some embodiments, only a forward pointer 212 is used, thereby effectuating only a single-linked list rather than a doubly-linked list). As depicted, cache entry pointer 206(1) points to a linked list having cached entries 208(I), 208(11). Cached entry 208(I) has a NULL back pointer 210(I) indicating that it is the first cached entry 208 in the linked list of the bin of cache entry pointer 206(1). Cached entry 208(I) also has a forward pointer 212(1) that points to the next cached entry 208(11) in the linked list of the bin of cache entry pointer 206(1). Cached entry 208(11) has a back pointer 210(II) that points to the previous cached entry 208(11) in the linked list of the bin of cache entry pointer 206(1). Cached entry 208(11) also has a NULL forward pointer 212(11) indicating that it is the last cached entry 208 in the linked list of the bin of cache entry pointer 206(1).

As depicted, cache entry pointer 206(3) points to a linked list having only a single cached entry 208(111). Cached entry 208(111) has a NULL back pointer 210(III) indicating that it is the first cached entry 208 in the linked list of the bin of cache entry pointer 206(3). Cached entry 208(111) also has a NULL forward pointer 212(111) indicating that it is the last cached entry 208 in the linked list of the bin of cache entry pointer 206(3).

As depicted, cache entry pointer 206(R) points to a linked list having only a single cached entry 208(IV). Cached entry 208(IV) has a NULL back pointer 210(IV) indicating that it is the first cached entry 208 in the linked list of the bin of cache entry pointer 206(R). Cached entry 208(IV) also has a NULL forward pointer 212(IV) indicating that it is the last cached entry 208 in the linked list of the bin of cache entry pointer 206(R).

Figure 3B:
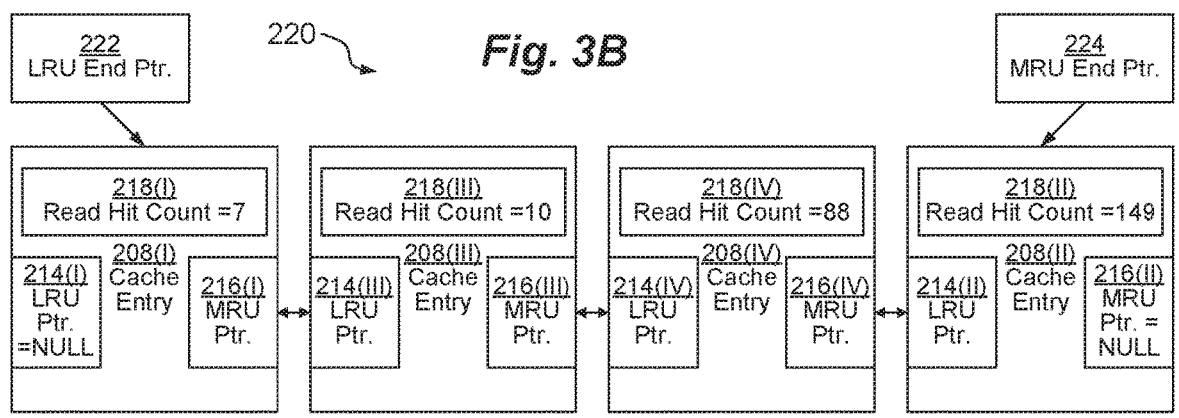

Each cache entry 208 may also store a least-recently-used (LRU) pointer 214 and a most-recently-used (MRU) pointer 216 to effectuate a linked list structure for deciding which cache entry 208 and associated cached data extent 268 to evict from the content-based cache 264 when room must be made for a new cache entry 208 and associated cached data extent 268. See FIG. 3B for a clearer view of this eviction linked list structure 220. An LRU end pointer 222 points to a first cache entry 208(I) at a least-recently-used end of the eviction linked list structure 220, while MRU end pointer 224 points to a last cache entry 208(11) at a most-recently-used end of the eviction linked list structure 220.

As depicted, cached entry 208(I) has a NULL LRU pointer 214(1) indicating that it is the least-recently accessed cached entry 208 in the eviction linked list structure 220. Cached entry 208(I) also has an MRU pointer 216(1) that points to the next cached entry 208(111) in the eviction linked list structure 220. Cached entry 208(111) has an LRU pointer 214(111) that points to the previous cached entry 208(I) in the eviction linked list structure 220. Cached entry 208(111) also has an MRU pointer 216(111) that points to the next cached entry 208(IV) in the eviction linked list structure 220. Cached entry 208(IV) has an LRU pointer 214(IV) that points to the previous cached entry 208(111) in the eviction linked list structure 220. Cached entry 208(IV) also has an MRU pointer 216(IV) that points to the next cached entry 208(111) in the eviction linked list structure 220. Cached entry 208(11) has an LRU pointer 214(11) that points to the previous cached entry 208(IV) in the eviction linked list structure 220. Cached entry 208(11) also has a NULL forward pointer 216(11) indicating that it is the last cached entry 208 in the eviction linked list structure 220.

The eviction linked list structure 220 is sorted by increasing order for the read hit counts 218. Thus, cached entry 208(I) is first (least-recently accessed) because it has the lowest read hit count 218(I) value of 7. Cached entry 208(111) is next because it has the next lowest read hit count 218(111) value of 10. Cached entry 208(IV) is next because it has the next lowest read hit count 218(IV) value of 88. Cached entry 208(11) is last (most-recently accessed) because it has the highest read hit count 218(11) value of 149. In some embodiments, every time a cache entry 208 is accessed by a READ or WRITE operation, the read hit count 218 value is incremented by an increment value (e.g., 1, 10). In some of these embodiments, every time a cache entry 208 is accessed by a READ or WRITE operation, the read hit count 218 value of all other cache entries 208 is decremented by a decrement value (e.g., 1). In other embodiments, a heuristic or other means may be used to evict cache entries 208 that have not been accessed recently. After incrementing (and, in some embodiments, decrementing) the read hit counts 218, storage driver stack 46 may sort the eviction linked list structure 220 based on the read hit counts 218 (and, in some embodiments, modifying the positions within the eviction linked list structure 220 by an age index so that less-recently-accessed entries 208 are demoted) and evict a cache entry 208 from the LRU end.

Figure 4:
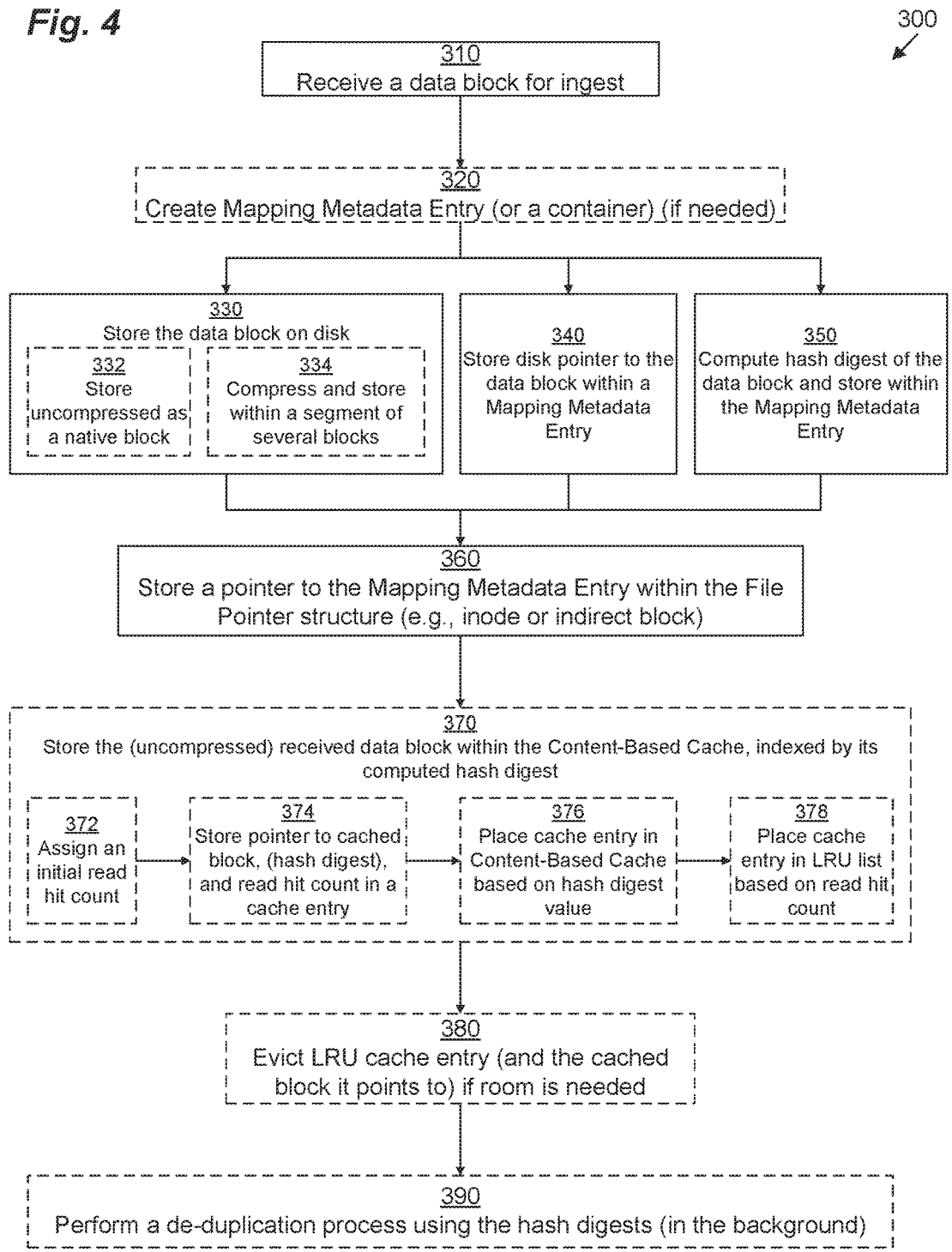
FIG. 4 is a flowchart depicting example methods of various embodiments.

FIG. 4 illustrates an example method 300 performed by storage driver stack 46 for ingesting data in accordance with various embodiments. It should be understood that any time a piece of software (e.g., storage driver stack 46) is described as performing a method, process, step, or function, in actuality what is meant is that a computing device (e.g., DSS computing device 32) on which that piece of software is running performs the method, process, step, or function when executing that piece of software on its processing circuitry 36. It should be understood that one or more of the steps or sub-steps of method 300 may be omitted in some embodiments. Similarly, in some embodiments, one or more steps or sub-steps may be combined together or performed in a different order. Method 300 is performed by DSS computing device 32.

In step 310, storage stack 46 receives a data block for ingest. The data block is meant to be stored in persistent storage and placed within a file of a filesystem 102. Step 310 may involve a WRITE storage request 48.

In step 320, if an unused mapping metadata entry 59 is not currently available, storage stack 46 creates one for use in method 300. This may involve allocating a new structure containing an aggregation of mapping metadata entries 59 or it may involve allocating a standalone mapping metadata entry 59.

Steps 330, 340, and 350 may be performed in parallel. Being performed in parallel means that the order of execution of these steps 330, 340, and 350 is unimportant; they may be performed simultaneously, in an overlapping manner, or any of them may be performed prior to or subsequent to the other(s).

In step 330, storage driver stack 46 stores the data block within persistent storage 44 as data extent 50. In some arrangements, step 330 is accomplished by performing sub-step 332. In sub-step 332, storage driver stack 46 stores the received data block directly within persistent storage as data extent 50 which takes up one block. Alternatively, in step 334, storage driver stack 46 compresses the received data block and stores the compressed result within persistent storage as a compressed data extent 150, which is smaller than a block, within a larger segment 151.

In step 340, storage driver stack 46 stores a pointer to the location 52 of the data extent as stored in persistent storage 44 within an unused mapping metadata entry 59(*x*).

In step 350, storage driver stack 46 computes a hash digest 60 of the received data block using a pre-defined hashing algorithm and stores the computed hash digest 60 within the mapping metadata entry 59(*x*).

In step 360, storage driver stack 46 stores a mapping pointer 56 that points to the mapping metadata entry 59(*x*) within the file pointer structure 54 for the file (or other structure) to which the data block is being assigned. This may include storing the mapping pointer 56 at the appropriate location within the file pointer structure 54 (e.g., at a particular location within an inode or indirect block) corresponding to the address within the file where the data block is being placed.

In optional step 370, storage driver stack 46 stores the received data block within the content-based cache 64 indexed by a key derived from the computed hash digest 60. In some embodiments, step 370 is only performed based on a heuristic; if the heuristic indicates that the received data block is not likely to be accessed soon again in comparison to other entries 208 already in the content-based cache 64, step 370 may be omitted.

In some embodiments, the received data block is stored in uncompressed form even if it is stored in compressed form in persistent storage 44. In some embodiments, step 370 may be accomplished by performing sub-steps 372-378.

In sub-step 372, storage driver stack 46 assigns an initial read hit count 218 (e.g., a value of 10) to the received data block. Then, in step 374, storage driver stack 46 stores (a) a pointer 69 to a cached copy 68 of the received data block within content-based cache 64 in memory 40, (b) the assigned read hit counter 218, and, in some embodiments, (c) the computed hash digest 60 within an unused cache entry 208(Y). In some embodiments, the read hit counter 218 may not be used. In step 376, storage driver stack 46 places that cache entry 208(Y) at a location within content-based cache indexed by a key derived from the hash digest 60. This may include deriving a key from the hash digest 60 (e.g., using hash index function 202) and locating a cache entry pointer 206 in array 204 having the key as its index and then inserting the cache entry 208(Y) onto a linked list pointed to by that cache entry pointer 206 (see FIG. 3A). In step 378, storage driver stack 46 places the cache entry 208(Y) at an appropriate location within eviction linked list structure 220 based on the assigned read hit count 218(Y) and the read hit counts 218 of the other cache entries 208 already on the eviction linked list structure 220 (in a sorted manner). This may involve setting or modifying LRU pointers 214 and MRU pointers 216 in the new cache entry 208(Y) as well as in any cache entries immediately before or after it in the eviction linked list structure 220. In some embodiments, instead of placing the cache entry 208(Y) within the eviction linked list structure 220 based on read hit counts 218, storage driver stack 46 may instead always place the new cache entry 208(Y) at the MRU end of the eviction linked list structure 220.

In step 380, if the content-based cache 64 is full, then storage driver stack 46 evicts a least-recently-used cache entry 208 (e.g., the cache entry 208 pointed to by the LRU end pointer 222). In some embodiments, step 380 may be performed prior to sub-step 378.

Finally, in step 390, in embodiments in which de-duplication is utilized, storage driver stack 46 may perform a de-duplication process based on the hash digests 60 so that mapping pointers 56 that point to mapping data entries 59 with equal hash digests 60 are assigned to both point to the same mapping data entry 59 and redundant data extents 50 in persistent storage 44 are removed (or never written to persistent storage 44 to begin with if they are still in a write cache waiting to be flushed). In some embodiments, this is performed as a background process.

FIG. 5 illustrates an example method 400 performed by storage driver stack 46 for responding to read requests in accordance with various embodiments. It should be understood that one or more of the steps or sub-steps of method 400 may be omitted in some embodiments. Similarly, in some embodiments, one or more steps or sub-steps may be combined together or performed in a different order. Method 400 is performed by DSS computing device 32.

In step 410, storage driver stack 46 receives a storage request 48 to read a particular logical block (e.g., at an address within a file).

In step 420, storage driver stack 46 obtains a hash digest 60 for that logical block from mapping metadata 58 for accessing the logical data block. In some embodiments, step 420 may be performed by performing sub-steps 422-426. In sub-step 422, storage driver stack 46 looks up the address of the logical block within a file pointer structure 54 (e.g., by finding an appropriate location within an Mode or indirect block that maps the file where the logical block is to be read from). In step 424, storage driver stack 46 obtains a mapping pointer 56 to a mapping metadata entry 59 from the appropriate location within the file pointer structure 54. Then, in step 426, storage driver stack 46 reads the hash digest 60 stored within the mapping metadata entry 59 pointed to by the mapping pointer 56.

In step 430, storage driver stack 46 determines whether or not the content-based cache 64 already stores a cache entry 208 indexed by the hash digest 60 obtained in step 420 (or a key derived therefrom). If the content-based cache 64 does not currently store a cache entry 208 indexed by the hash digest 60, then operation proceeds with step 440, but if the content-based cache 64 already does store a cache entry 208 indexed by the hash digest 60, then operation proceeds with step 470.

In step 440, storage driver stack 46 reads the logical data block from the extent 50 of persistent storage (or possibly from another cache within memory). If the extent 50 is compressed, then it is first decompressed.

In optional step 450, storage driver stack 46 adds the logical data block read in step 440 into the content-based cache 64, indexed by the hash digest 60 (or a key derived therefrom). This step may be performed in a similar manner as step 370, including sub-steps 372-378 in some embodiments. In some embodiments, step 450 is only performed based on a heuristic. For example, if the read hit count of the logical data block is less than the lowest read hit count 218 within the content-based cache 64 (e.g., the read hit count 218 of the cache entry 208 targeted for eviction next), step 450 may be omitted.

In step 460, if the content-based cache 64 is full, then storage driver stack 46 evicts a least-recently-used cache entry 208 (e.g., the cache entry 208 pointed to by the LRU end pointer 222). In some embodiments, step 460 may be performed prior to sub-step 378 of step 450.

In step 470, storage driver stack 46 fulfills the storage request 48 by returning a cached data extent 68 from the content-based cache 64 indexed by the hash digest 60. Since this cached data extent 68 is stored within memory, the underlying data extent 50 need not be read from persistent storage 44. In addition, even if the underlying data extent 150 is compressed, because the cached data extent 68 is stored in the content-based cache 64 in uncompressed form, no decompression operation is needed.

In step 480, if read hit counts 218 are being used, storage driver stack 46 updates the read hit counts 218 for the cache entries 208 on the eviction linked list structure 220. In one embodiment, this may include incrementing the read hit count 218 of the cache entry 208 from which the cached data extent 68 was read (i.e., the cache entry 208 that contained the cached extent pointer 69 to that cached data extent 68) by the increment value and decrementing the read hit counts 218 of all other cache entries on the eviction linked list structure 220. In any case, storage driver stack 46 updates the eviction linked list structure 220. In one embodiment, this may include adding the new cache entry 208 to the MRU end of the eviction linked list structure 220. In another embodiment, this may involve placing the new cache entry 208 at a location within the eviction linked list structure 220 based on its read hit count 218 and the read hit counts 218 of the other cache entries 208 on the eviction linked list structure 220.

Thus, techniques have been presented for read caching that work well for random read requests 48. This may be accomplished by caching data based on its content, rather than on its sequentiality. For example, DSS computing device 32 may compute hash digests 60 that identify extents of persistent data based on their contents and store such hash digests 60 as metadata. When processing read requests 48 to access extents of data, the storage system 32 accesses metadata 58 for the extents and retrieves their hash digests 60. The storage system 32 may then use the retrieved hash digests 60 for indexing into a content-based cache 64, 264, where the hash digests 60 correspond to locations of extents of data 68 in the cache 64, 264. This approach allows data to be retrieved quickly based on content, and is thus effective for both sequential data and for random data. In addition, the disclosed techniques may be easily implemented in systems that already support hash digests 60 for data de-duplication, regardless of whether de-duplication is implemented or not.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of responding to requests to read data from a computerized data storage system, the method comprising:

receiving a request to access a set of data stored in an extent of persistent storage of the computerized data storage system, wherein the request is directed to data of a filesystem element;

obtaining, from mapping metadata provided for locating the requested extent, a hash digest of the set of data, the hash digest identifying contents of the set of data, wherein obtaining the hash digest from the mapping metadata includes:

obtaining a mapping pointer from a pointer tree used for mapping the filesystem element, the mapping pointer pointing to a mapping metadata entry; and obtaining the hash digest from the mapping metadata entry, the mapping metadata entry including the hash digest and a data pointer to a location of the extent in the persistent storage;

indexing into a content-based cache within memory of the computerized data storage system with a key based on the hash digest to locate a cached copy of the set of data within the memory; and returning the cached copy of the set of data from the memory without accessing the extent of data from persistent storage.

2. The method of claim 1, wherein the filesystem element is a first storage object;

wherein the contents of the set of data are included within the first storage object as well as within a second storage object; and wherein the method further comprises, prior to receiving the request, storing the cached copy of the set of data in the content-based cache within memory in response to a previous data storage command directed at the second storage object.

3. The method of claim 2, wherein another mapping pointer from another pointer tree used for mapping the second storage object also points to the mapping metadata entry; and wherein the method further comprises, prior to receiving the request, storing the cached copy of the set of data in the content-based cache within memory in response to a read request directed to the location of the extent in the persistent storage.

4. The method of claim 3 wherein the method further comprises, prior to receiving the request, storing the hash digest of the set of data and the data pointer to the location of the extent in the mapping metadata entry in response to a previous write request directed at the second storage object.

5. The method of claim 2,
wherein another mapping pointer from another pointer tree used for mapping the second storage object points to another mapping metadata entry, the other mapping metadata entry including the hash digest and another data pointer to another location in the persistent storage where another copy of the set of data is stored; and
wherein the method further comprises, prior to receiving the request, storing the cached copy of the set of data in the content-based cache within memory in response to a read request directed to the other location in the persistent storage.

6. The method of claim 5 wherein the first storage object is located within a first filesystem and the second storage object is located within a second filesystem different from the first filesystem.

7. The method of claim 6 wherein one of the first filesystem and the second filesystem supports de-duplication, while another one of the first filesystem and the second filesystem does not support de-duplication.

8. The method of claim 1 further comprising, prior to receiving the request, storing the hash digest of the set of data and the data pointer to the location of the extent in the mapping metadata entry in response to a write request directed at the filesystem element.

9. The method of claim 1, wherein the extent is a block of persistent storage that stores the set of data in uncompressed form.

10. The method of claim 1,
wherein the location of the extent on the persistent storage pointed to by the data pointer is offset within a set of blocks of persistent storage that stores the extent in compressed form together with other compressed extents;
wherein the cached copy of the set of data is stored in uncompressed form within the memory; and
wherein, when returning the cached copy, the uncompressed cached copy of the extent of data is returned without performing a decompression operation.

11. The method of claim 1 wherein the method further comprises:
promoting the cached copy of the set of data towards a head of a least-recently used (LRU) list; and
evicting, from the content-based cache within the memory, a cached set of other data from a tail of the LRU list.

12. The method of claim 1 wherein indexing into the content-based cache includes searching for the hash digest within the content-based cache.

13. The method of claim 1 wherein indexing into the content-based cache includes deriving the key from the hash digest and accessing a memory location within the content-based cache, the memory location defined by the key.

14. The method of claim 1 wherein the pointer tree includes an inode and a set of indirect blocks, the inode and each of the indirect blocks including a respective set of mapping pointers that each point to a mapping metadata entry.

15. An apparatus for responding to requests to read data, the apparatus comprising:
network interface circuitry for connecting to a network;
persistent storage; and
processing circuitry coupled to memory configured to:
receive a request, via the network interface circuitry, to access a set of data stored in an extent of the persistent storage, wherein the request is directed to data of a filesystem element;
obtain, from mapping metadata provided for locating the requested extent, a hash digest of the set of data, the hash digest identifying contents of the set of data, wherein obtaining the hash digest from the mapping metadata includes:
obtaining a mapping pointer from a pointer tree used for mapping the filesystem element, the mapping pointer pointing to a mapping metadata entry; and
obtaining the hash digest from the mapping metadata entry, the mapping metadata entry including the hash digest and a data pointer to a location of the extent in the persistent storage;
index into a content-based cache within the memory with a key based on the hash digest to locate a cached copy of the set of data within the memory; and
return, via the network interface circuitry, the cached copy of the set of data from the memory without accessing the extent of data from persistent storage.

16. A computer program product comprising a non-transitory computer-readable storage medium storing instructions, which when executed by a computerized data storage system cause the computerized data storage system to respond to requests to read data from the computerized data storage system by:
receiving a request to access a set of data stored in an extent of persistent storage of the computerized data storage system, wherein the request is directed to data of a filesystem element;
obtaining, from mapping metadata provided for locating the requested extent, a hash digest of the set of data, the hash digest identifying contents of the set of data, wherein obtaining the hash digest from the mapping metadata includes:
obtaining a mapping pointer from a pointer tree used for mapping the filesystem element, the mapping pointer pointing to a mapping metadata entry; and
obtaining the hash digest from the mapping metadata entry, the mapping metadata entry including the hash digest and a data pointer to a location of the extent in the persistent storage;
indexing into a content-based cache within memory of the computerized data storage system with a key based on the hash digest to locate a cached copy of the set of data within the memory; and
returning the cached copy of the set of data from the memory without accessing the extent of data from persistent storage.

* * * * *